(12) United States Patent
Gimblet et al.

(10) Patent No.: US 6,567,592 B1
(45) Date of Patent: May 20, 2003

(54) OPTICAL CABLES WITH FLEXIBLE STRENGTH SECTIONS

(75) Inventors: Michael J. Gimblet, Hickory, NC (US); Kenneth F. Dunn, Jr., Statesville, NC (US)

(73) Assignee: Corning Cable Systems LLC, Hickory, NC (US)

( * ) Notice: Subject to any disclaimer, the term of this patent is extended or adjusted under 35 U.S.C. 154(b) by 18 days.

(21) Appl. No.: 09/676,035

(22) Filed: Sep. 29, 2000

(51) Int. Cl.[7] .................................................. G02B 6/44
(52) U.S. Cl. ....................................................... 385/113
(58) Field of Search ................................. 385/101, 102, 385/103, 104, 105, 106, 107, 109, 110, 111, 112, 113

(56) References Cited

U.S. PATENT DOCUMENTS

| | | | |
|---|---|---|---|
| 4,467,138 A | 8/1984 | Brorein ........................ 174/115 |
| 4,729,628 A | 3/1988 | Kraft et al. ................ 350/96.23 |
| 5,201,020 A * | 4/1993 | Kannabiran .................. 385/113 |
| 5,469,523 A * | 11/1995 | Blew et al. .................. 385/109 |
| 5,651,081 A | 7/1997 | Blew et al. .................. 385/101 |
| 6,327,409 B1 * | 12/2001 | Chabot et al. ............... 385/102 |
| 6,411,761 B1 * | 6/2002 | Yokokawa et al. .......... 385/114 |
| 6,434,304 B2 * | 8/2002 | Gao et al. .................... 385/109 |

* cited by examiner

*Primary Examiner*—Javaid Nasri
(74) *Attorney, Agent, or Firm*—Timothy J. Aberle

(57) ABSTRACT

A fiber optic cable (40) having at least one optical component (1,2,3) therein, and a cable jacket (8) surrounding the optical component. Strength sections (6,7) are defined between the optical-component and the cable jacket, the strength sections comprising generally crescent-like cross sections. The generally crescent-like cross sections have respective generally concave and generally convex faces (9,10). The generally concave face (9) has a general center that is preferably aligned with the longitudinal axis of the cable, and the generally convex face (10) has a general center that is preferably offset from a longitudinal.axis of the fiber optic cable. The convex faces subtend respective angles ( ) of about 45° to about 160°. The cable jacket (8) defining contact interfaces (11,12) with the optical component, the contact interfaces being respectively disposed between the strength sections (6,7). A fiber optic cable having relatively large, force-absorbing transverse dimensions is also disclosed.

15 Claims, 2 Drawing Sheets

OPTICAL CABLES WITH FLEXIBLE STRENGTH SECTIONS

The present invention relates to fiber optic cables generally, and, more particularly, to fiber optic cables having strength sections.

BACKGROUND OF THE INVENTION

The background art includes cables that can be expensive, relatively stiff, and/or relatively large. For example, U.S. Pat. No. 5,651,081 discloses a composite cable with optical fibers housed in a loose tube that is contained within a plastic jacket. The jacket embeds insulated electrical conductors and optionally also metallic strength members and ripcords. The cable core loosely contains at least one optical fiber, one or more electrical conductors having an outer polymer insulating layer, one or more strength members, and a surrounding protective jacket. The protective jacket is formed of a polymer material that forms a distinct mechanically separate phase from the polymer material forming the insulation layer surrounding the respective electrical conductors. For example, the jacket can be made of a polymer material having a melting temperature lower than the melting temperature of the insulating material of the electrical conductors.

U.S. Pat. No. 4,467,138 discloses a generally flat composite cable construction with a messenger wire section and two transmission sections with a common jacket designed to be split along preformed lines of reduced thickness. One of the sections includes one or more optical fibers, exemplified by tight-buffered fibers directly embedded in the jacket. The flat construction includes two or more pairs of communication gage polyolefin insulated wires, twisted along their length, disposed in groups on opposite sides and parallel to a conductive steel wire. The steel wire may be galvanized or copper clad. All of the foregoing are embedded in a PVC jacket with the PVC material bonded to the steel wire but unbonded to the insulated communication gage wires. Weakening lines permit separation into central and side parts with an intact PVC jacket on each part. When used as telephone drop wire the steel wire provides both physical support and electrical conductivity for supplemental or primary grounding. The wire shape and size permits use of existing hardware for installation. Alternatively, a group of wires on at least one side is replaced either by a coaxial cable or by one or more polyolefin jacketed optical fiber conductors.

U.S. Pat. No. 4,729,628 discloses a fiber optic component between two strength members within a cable jacket. The optical component has an outer coating with a higher melting point than the material of the cable jacket. The cable is suitable for use as a fiber optic dropwire.

BRIEF SUMMARY OF THE INVENTIONS

One aspect of the present invention includes a fiber optic cable having at least one optical component therein, a cable jacket surrounding the optical component, and strength sections defined between the optical component and the cable jacket, at least one of the strength sections comprising strength components defining a generally crescent-like cross section.

A preferred embodiment of the present invention comprises a fiber optic cable having at least one optical component therein, and a cable jacket surrounding the optical component. Strength sections are defined between the optical component and the cable jacket, the strength sections defining generally crescent-like cross sections. The generally crescent-like cross sections have respective generally concave and generally convex faces. The generally concave faces have general centers of arc that are preferably aligned with the longitudinal axis of the cable, and the generally convex faces have general centers of arc that are preferably offset from a longitudinal axis of the fiber optic cable. The convex faces subtend respective angles of about 45° to about 160°. The cable jacket defining contact interfaces with the optical component, the contact interfaces being respectively disposed between the strength sections.

DETAILED DESCRIPTION OF THE INVENTIONS

Figure 1:
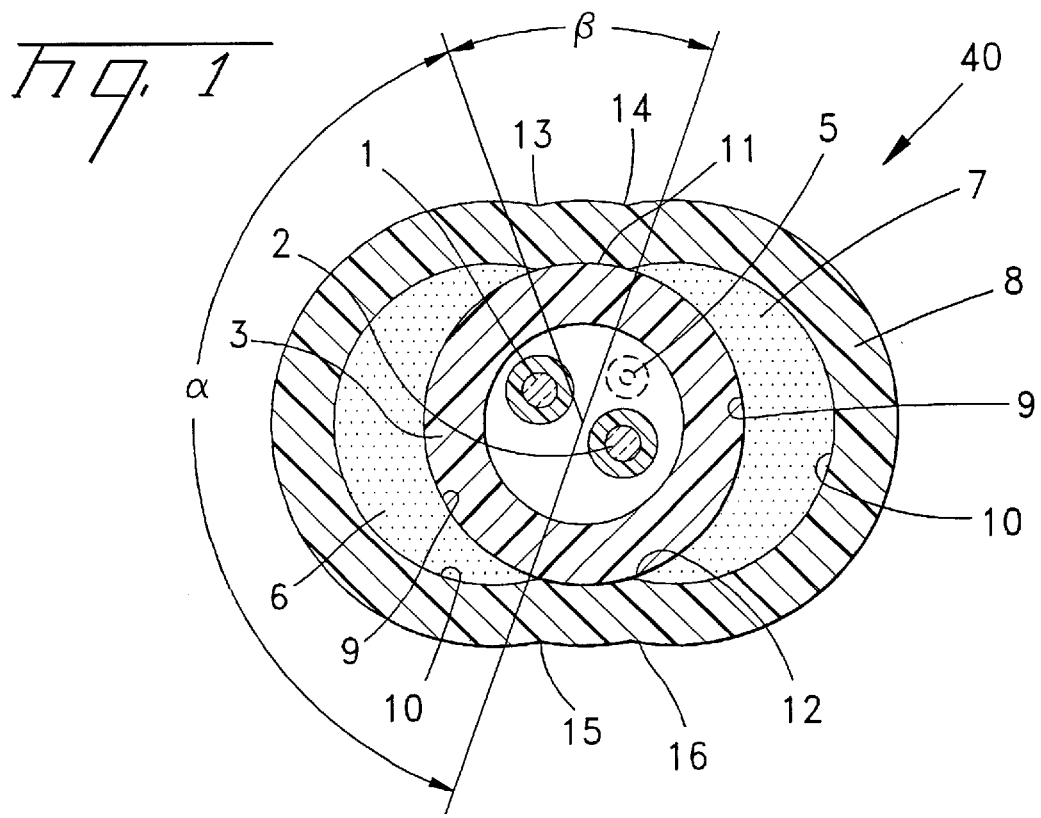
FIG. 1 is a cross sectional view of a first embodiment of a fiber optic cable according to the present invention.
Figure 2:
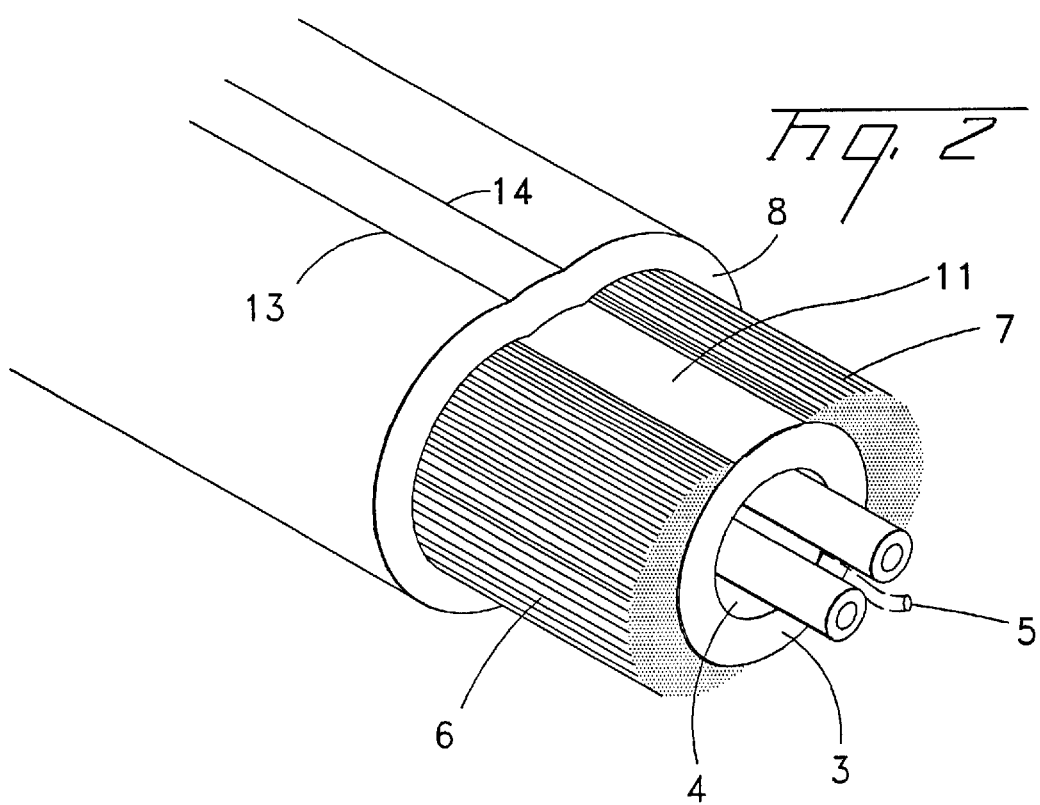
FIG. 2 is an isometric view of the fiber optic cable of FIG. 1.

FIGS. 1 and 2 show a fiber optic cable 40 according to a first embodiment of the present invention. In a preferred embodiment, fiber optic cable 40 includes an optical component that, for example, includes at least one, but more preferably at least two, silica-based optical fibers loosely received in a buffer tube 3 or tight buffered fibers (not shown). Tube 3 is preferably formed of a theromoplastic material, for example, impact-modified polypropylene or an aromatic polyamide, and is preferably aligned with a generally centrally disposed longitudinal axis of the cable. The preferred ID of tube 3 is about 1.0 mm, and the preferred OD is about 1.8 mm to about 3.0 mm. Preferably there is a controlled excess fiber length compared with the length of the tube to protect the fibers from risk elongation or fracture. Tube 3 preferably includes a water-blocking substance, e.g., a grease or a superabsorbent compound. Super absorbent materials are commercially available in yarn, tape or powder form, and for the present invention a waterblocking yarn 5 is preferred.

The tube 3 is enclosed, together with at least one but preferably two strength sections 6 and 7 in an extruded jacket 8. Strength sections 6 and 7 are preferably located in generally opposed locations, and are generally crescent-like in cross section. At least one but preferably both strength sections include a generally concave face 9, defining an arc that has a general center that is preferably offset from the longitudinal axis of the cable, and a generally convex face 10, defining an arc that has a general center that is preferably aligned with the longitudinal axis of the cable. Although the convex and concave faces are preferably defined by general arcs that have at least one but preferably two coterminous points, the faces may include at least one respective flat portion (not shown). The strength sections together with the optical component and cable jacket form a broadly oval cross sectional shape with preferably no void spaces. Jacket interface portions 11 and 12, defined between strength sections 6 and 7, are formed by portions of jacket 8 that contact and mechanically and/or chemically bond with outer portions of tube 3, assisting in the ability of the cable to retain its shape and functionality when subjected to moderate crushing forces. Preferably convex faces 10 subtend an angle (FIG. 1) of about 45° to about 160°, more preferably about 60° to about 145°, and most preferably about 50° to 135°. Jacket interface portions 11 and 12, define complementary angles β.

The strength sections are formed of preferably compacted but substantially unbonded structural fibers. Either structural glass fibers, for instance of E-glass, or high-strength polymer fibers, for instance of aramid, are suitable. Metallic materials may be used as well, e.g., steel or copper wires or fibers. Preferably, the fibers are compacted by pulling them through a die that is shaped and dimensioned to achieve the desired generally crescent-like cross sectional shape and ensure adequate density. Alternatively or in addition to use of a die, sufficient compaction can be obtained by extruding the jacket by a pressure extrusion technique, and relying on the pressure inherent in the pressure extrusion process to compact the fibers. Use of substantially unbonded fibers ensures a cable of good flexibility, especially at low temperatures, compared with the more conventional use of resin-bonded fiber rods or of metal wires. In other words, the strength fibers are not highly bonded by resins to the point of defining, collectively, a stiff rod. The fibers may, however, be connected together by some thermoset or thermoplastic materials with a moderate impact on overall cable stiffness.

Jacket 8 is preferably formed of a thermoplastic material, for example, medium density polyethylene. Jacket 8 can include longitudinal grooves 13–16 that preferably overlie and generally indicate the locations of the jacket interfaces. Grooves 13–16 are visually inconspicuous but easily located by touch, and they may be deep enough to form lines of controlled weakness along which the jacket 8 can be torn by hand. Grooves 13–16 enable the quick and easy separation of the fiber unit from the structured fibers as required for termination in the particular circumstances of an installation. For example, the strength fibers may sometimes need to be secured to a building or other structure to support the weight of the cable, for example with a cable clamp, while the fiber unit continues into the building without an undesirable tensile load. If the grooves are less deep, separation can nevertheless be easily achieved, using a very simple tool.

The cable of FIGS. 1 and 2 can be made in very small sizes; for example, a loose tube internal diameter of about 1 mm is practicable, compared with about 1.8 to 3.0 mm for conventional loose tubes, while a breaking strain of as much as 300 lb force can still be secured without difficulty. Small size not only improves flexibility but reduces material costs, visual obtrusiveness and wind forces. The construction has a strongly preferred bending axis, that is advantageous when installing the cable into a clamp, since it makes it easy to ensure that clamping forces act on the cable in the intended direction.

The cable of FIGS. 1 and 2 may be modified in various other ways, for example, two or more optical fiber units could be incorporated into the cable if desired, or the fibers could be presented as a fiber ribbon. Further, cable 40 can include one or more flexible electrical conductors. For example, a twisted pair of insulated conductors or coaxial conductor pairs may be used. Separate single insulated conductors may be used instead, or a conductor pair may be formed simply by extruding a shared insulating coating onto a parallel pair of wires. Cable 40 can include a second tube (not shown) to accommodate electrical conductors, or the conductors can be incorporated within or at the surface of one or both of the strength sections, for instance, by being bundled with the structural fibers of the preferred tension members. Where there are two or more insulated conductors, they will usually be distinguished by coloring of other visible marking of the insulation; uninsulated conductors could be distinguished by position in the cable and/or by different cross sectional shapes or surface textures.

Figure 3:
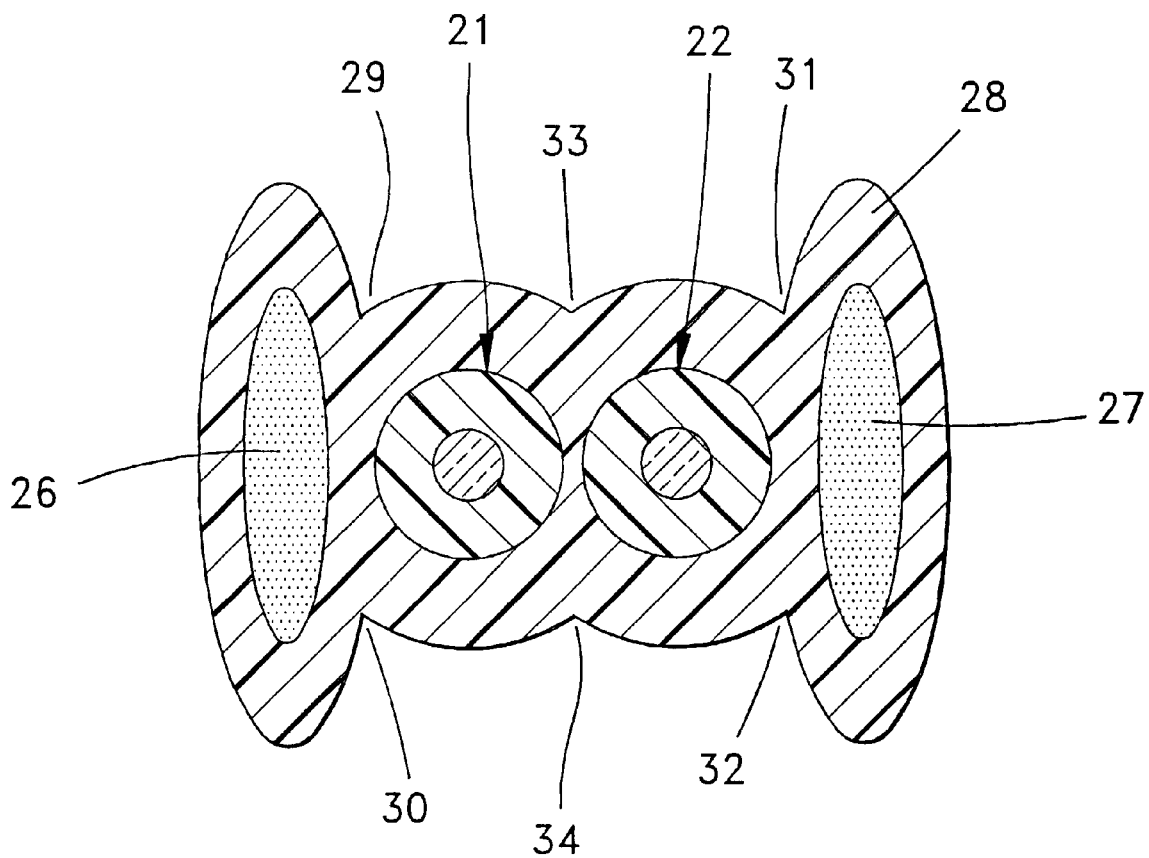
FIG. 3 is a cross sectional view of a second embodiment of the present invention.

FIG. 3 shows a second embodiment of the invention, using tight buffered fibers 21 and 22, for example, about 900 $\mu$m OD, with sufficient resistance to tensile forces to be used without a loose enclosing tube. The buffered fibers are directly embedded in jacket 28 that also embeds generally oval strength sections 26 and 27. The strength sections include, for example, aramid fibers or fiberglass. Metallic substances may be used as well, e.g., steel or copper wires or fibers. A transverse dimension of at least one but preferably both of the strength sections is greater than an OD of an optical component 21,22. The transverse dimension is a larger than the optical component by a factor of about 1.10 to about 30, preferably about 1.5 to 20, and most preferably about 2.0 to 10 times the OD of the optical component. The relatively large transverse dimension absorbs clamping forces, and is useful in avoiding the application of direct cable clamping forces to the optical components. Other materials and cross sectional shapes can be used, and in particular a round cross section might be preferred to avoid the need to control orientation during the application of the jacket. As in the example previously described, longitudinal grooves 29, 30, 31 and 32 provide the means of tearing to separate the tension members from the fibers, and additional grooves 33 and 34 provide similarly for the separation of the fibers from each other. This design of cable has a very strongly preferred bending axis, and can be made in extremely small sizes; for instance using tight buffered fibers with an overall diameter of 0.9 mm, a cable with cross sectional dimensions at least as small as 4.4 by 3.4 mm is easily possible. As shown in FIG. 3 strength sections 26,27 provide a high degree of protection from compressive forces.

The present invention has thus been described with reference to the foregoing embodiments, which embodiments are intended to be illustrative of the present inventive concepts rather than limiting. Persons of ordinary skill in the art will appreciate that variations and modifications of the foregoing embodiments can be made without departing from the scope of the appended claims.

Accordingly, what is claimed is:

1. A fiber optic cable having at least one optical component therein, said fiber optic cable comprising:
   a cable jacket surrounding said optical component, said cable jacket defining at least one contact interface with said optical component;
   strength sections defined between said optical component and said cable jacket, at least one of said strength sections comprising a generally crescent-like cross section.

2. The fiber optic cable of claim 1, said at least one crescent-like cross section having convex and concave surfaces generally coterminous at respective ends thereof.

3. The fiber optic cable of claim 1, said strength sections being located in generally opposed locations relative to a longitudinal axis of said cable.

4. The fiber optic cable of claim 1, said at least one strength section comprising a convex face subtending an angle of about 45° to about 160° that is generally offset from a longitudinal axis of said fiber optic cable.

5. The fiber optic cable of claim 1, said at least one strength section comprising a convex face subtending an angle of about 60° to about 145° that is generally offset from a longitudinal axis of said fiber optic cable.

6. The fiber optic cable of claim 1, said at least one strength section comprising a convex face subtending an angle of about 50° to 135° that is generally offset from a , longitudinal axis of said fiber optic cable.

7. The fiber optic cable of claim 1, said at least one strength section comprising substantially unbonded structural fibers.

8. The fiber optic cable of claim 1, said cable jacket being pressure extruded to compact the strength sections.

9. The fiber optic cable of claim 1, said jacket being with longitudinal grooves.

10. The fiber optic cable of claim 1, said strength sections defining a preferred bending axis.

11. The fiber optic cable of claim 1, said strength sections comprising dielectric or metallic materials.

12. A fiber optic cable having at least one optical component therein, said fiber optic cable comprising:

a cable jacket surrounding said optical component; discrete strength sections defined between said optical component and said cable jacket, said strength sections comprising generally crescent-like cross sections;

said generally crescent-like cross sections comprising respective generally convex and generally concave faces, said generally convex face having a general center that is offset from a longitudinal axis of said fiber optic cable, and said generally concave face having a general-center that is aligned with said longitudinal axis of the cable.

13. The fiber optic cable of claim 12, said convex faces subtending an angle of about 45° to about 160°.

14. The fiber optic cable of claim 12, said cable jacket defining contact interfaces with said optical component, said contact interfaces being respectively disposed between said strength sections.

15. The fiber optic cable of claim 12, said strength sections defining a preferred bending axis.

* * * * *